(No Model.)

H. L. MOULTON.
SPOOL OR BOBBIN.

No. 461,686. Patented Oct. 20, 1891.

Witnesses:
R. Schleicher.
A. V. Groupe.

Inventor:
Hamilton L. Moulton
by his Attorneys
Howson & Howson

UNITED STATES PATENT OFFICE.

HAMILTON L. MOULTON, OF PHILADELPHIA, PENNSYLVANIA, ASSIGNOR TO THE JAMES SMITH WOOLEN MACHINERY COMPANY, OF SAME PLACE.

SPOOL OR BOBBIN.

SPECIFICATION forming part of Letters Patent No. 461,686, dated October 20, 1891.

Application filed May 11, 1891. Serial No. 384,577. (No model.)

*To all whom it may concern:*

Be it known that I, HAMILTON L. MOULTON, a citizen of the United States, and a resident of Philadelphia, Pennsylvania, have invented certain Improvements in Spools or Bobbins, of which the following is a specification.

The object of my invention is to prevent the accidental loosening or removal of the projecting pintles or journals of spools or bobbins; and this object I attain in the manner hereinafter set forth, reference being had to the accompanying drawings, in which—

Figure 1:
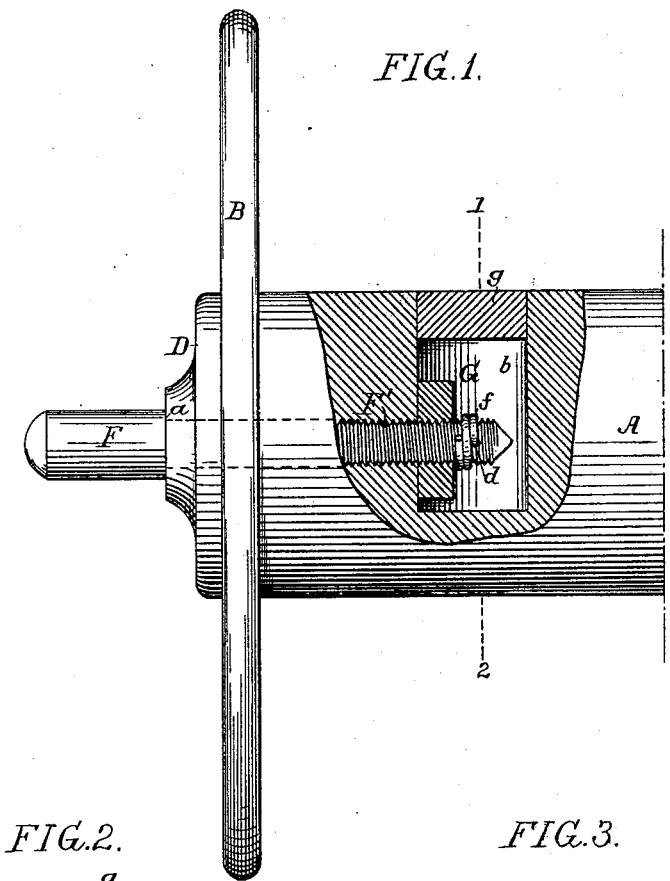
Figure 2:
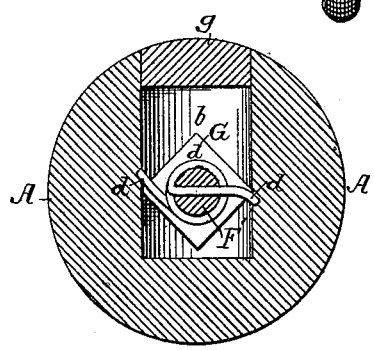

Figure 1 is a side view, partly in section, of the end portion of a spool or bobbin having a pintle or journal secured thereto in accordance with my invention. Fig. 2 is a transverse section on the line 1 2, Fig. 1; and Fig. 3 is a sectional plan view on the line 3 4, Fig. 2.

Figure 3:
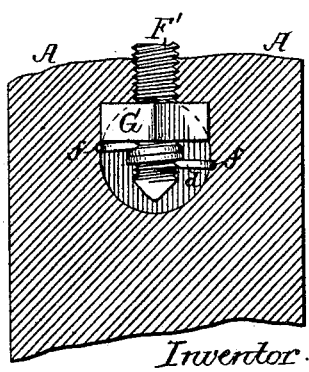

A represents the body or stock of the spool or bobbin, B one of the heads of the same, and D a washer beyond said head and bearing upon the central portion of the same, this washer being confined by means of a shoulder *a*, formed by reducing in diameter the journal or pintle F, which projects beyond the washer, the reduced portion or stem F' of said pintle passing through the washer, through the end B of the spool, and part way into the body of the same, so as to terminate in a transverse opening *b*, formed in said body, the inner end of the stem of the pintle being threaded, as shown in Figs. 1 and 3. To that portion of the threaded stem F' which is contained within the opening *b* is adapted a nut G, which is of such a size that it is by contact with the walls of the opening *b* prevented from turning, and in the threaded portion of the stem F' beyond said nut is a transverse opening *d*, to which is adapted a retaining-wire *f*, which is preferably coiled around the screw-stem between the opening *d* and the nut G, so that the coils lie closely together, and the last coil lies snugly against the nut and thus prevents any reverse movement or loosening of the pintle, one or both ends of the wire also, by preference, projecting so as to engage with one or more of the walls of the opening *b*, as shown, for instance, in Fig. 1, the wire possessing sufficient resiliency to maintain the backwardly-bent ends of the same in contact with said walls.

In applying the pintle to the spool the nut is first slipped into the opening *b*, and the stem of the pintle is then screwed into and through the nut until the opening *d* in the stem is beyond said nut, whereupon the wire *f* is passed through said opening, and the turning of the pintle is continued until the shoulder of the same has a firm bearing upon the washer D and the nut G is firmly seated in the opening *b*. After the application of the pintle the outer end of the opening *b* is preferably closed by means of a plug *g*.

Having thus described my invention, I claim and desire to secure by Letters Patent—

1. The combination of the spool or bobbin having a transverse opening therein, the nut contained within said opening, the pintle having a threaded stem in which beyond the nut is a transverse opening, and a wire adapted to said opening in the stem of the pintle and having an end bearing against one or more of the walls of the opening in the spool or bobbin, substantially as specified.

2. The combination of the spool or bobbin having a transverse opening therein, the nut contained within said opening, the pintle having a threaded stem in which beyond the nut is a transverse opening, and a wire adapted to said opening and coiled around the stem of the pintle between the opening in the same and the nut, said wire having an end bearing against one or more of the walls of the opening in the spool or bobbin, substantially as specified.

In testimony whereof I have signed my name to this specification in the presence of two subscribing witnesses.

HAMILTON L. MOULTON.

Witnesses:
WM. T. HECKLER,
HARRY SMITH.